United States Patent
Ham et al.

(10) Patent No.: US 7,965,360 B2
(45) Date of Patent: Jun. 21, 2011

(54) FABRICATION METHOD OF A COMPENSATION FILM COMPRISING RUBBING AND USING A BEAM

(75) Inventors: Yong Sung Ham, Anyang-si (KR); Su-Hyun Park, Anyang-si (KR); Ha Young Lee, Seoul (KR)

(73) Assignee: LG Display Co., Ltd., Seoul (KR)

(*) Notice: Subject to any disclaimer, the term of this patent is extended or adjusted under 35 U.S.C. 154(b) by 425 days.

(21) Appl. No.: 11/158,003

(22) Filed: Jun. 21, 2005

(65) Prior Publication Data

US 2006/0001807 A1    Jan. 5, 2006

(30) Foreign Application Priority Data

Jun. 30, 2004 (KR) .................. 10-2004-0050549

(51) Int. Cl.
- G02F 1/1337    (2006.01)
- G02F 1/1335    (2006.01)
- G02F 1/13      (2006.01)

(52) U.S. Cl. .................. 349/123; 349/117; 349/187
(58) Field of Classification Search .............. 349/117, 349/118, 119, 123–136, 187
See application file for complete search history.

(56) References Cited

U.S. PATENT DOCUMENTS

| | | | | |
|---|---|---|---|---|
| 5,764,326 A * | 6/1998 | Hasegawa et al. | ............ | 349/124 |
| 6,061,113 A * | 5/2000 | Kawata | ............ | 349/117 |
| 6,124,914 A * | 9/2000 | Chaudhari et al. | ............ | 349/129 |
| 6,600,536 B1 * | 7/2003 | Kuwabara et al. | ............ | 349/117 |
| 6,894,751 B2 * | 5/2005 | Payne et al. | ............ | 349/117 |
| 7,079,208 B2 * | 7/2006 | Kim et al. | ............ | 349/119 |
| 7,118,786 B2 * | 10/2006 | Aminaka et al. | ............ | 428/1.1 |
| 7,253,859 B2 * | 8/2007 | Ishizaki | ............ | 349/117 |
| 2002/0006587 A1 * | 1/2002 | Kwon et al. | ............ | 430/321 |
| 2002/0041352 A1 * | 4/2002 | Kuzuhara et al. | ............ | 349/117 |
| 2005/0068479 A1 * | 3/2005 | Moriya | ............ | 349/117 |

FOREIGN PATENT DOCUMENTS

| | | |
|---|---|---|
| JP | 2000-010099 | 1/2000 |
| KR | 10-0208970 | 7/1999 |
| KR | 10-0230532 | 11/1999 |
| KR | 2002-31042 | 4/2002 |

OTHER PUBLICATIONS

Gibbons et al., Surface-mediated alignment of nematic liquid crystals with polarized laser light, Nature, vol. 351, 1991, pp. 49-50.*
Office Action issued in corresponding Korean Patent Application No. 10-2004-0050549, mailed Oct. 15, 2010.

* cited by examiner

*Primary Examiner* — Brian M. Healy
*Assistant Examiner* — Charles Chang
(74) *Attorney, Agent, or Firm* — Brinks Hofer Gilson & Lione

(57) ABSTRACT

A method of fabricating an LCD is provided. According to the method, an alignment film is printed and hardened on a first substrate and a second substrate. Subsequently, the alignment film is subject to a primary alignment process and a subsequent secondary alignment process. The primary alignment process includes a rubbing process and the secondary alignment process includes irradiating light on the entire surface of the rubbed alignment film. Finally, retarder LC materials are coated and hardened on the light-irradiated alignment film to form a first compensation film and a second compensation film.

5 Claims, 5 Drawing Sheets

$n_x = n_y > n_z$ $n_x > n_z > n_y$ $n_x > n_y > n_z$

FABRICATION METHOD OF A COMPENSATION FILM COMPRISING RUBBING AND USING A BEAM

This application claims the benefit of priority to Korean Patent Application No. 10-2004-0050549 filed on Jun. 30, 2004, herein incorporated by reference.

BACKGROUND

1. Field of the Invention

The present invention relates to a liquid crystal display device (LCD), and more particularly, to a method of fabricating an LCD having an improved alignment characteristic with a coating-type compensation film.

2. Description of the Related Art

Liquid crystal (LC) molecule has anisotropy. The anisotropy of a LC cell having the LC molecules or a film may be changed according to distribution of the LC molecules and/or tilt angles relative to a substrate. The change of the anisotropy also changes the polarization of light relative to a viewing angle from which the LC cell is viewed. Due to unique characteristics of the LC cell, brightness and contrast ratio of a display may be different depending on a viewing angle from a top/bottom position and a left/right position.

A compensation film may be attached to compensate the anisotropy distribution due to the viewing angle of the LC cell. The compensation film is manufactured to have anisotropy distribution opposite to the anisotropy distribution of the LC cells so that a retardation difference due to the viewing angle may be removed when the compensation film is attached on the cells.

The compensation film using a high molecular film generates a phase difference of the transmitted light. The compensation film, which is extension-processed to a predetermined direction, has a birefringence due to the anisotropy of the molecules.

When an external magnetic field is applied to a twisted nematic (TN) LCD of a normally black mode, the LC molecules arrange in response to the electric field, so that light transmission occurs according to the following equation:

$$I=I_O \sin^2[\theta(1+u^2)^{1/2}], u=\pi R/\theta\lambda, R=\Delta n \cdot d \quad (1)$$

where I is intensity of transmitted light, $I_O$ is luminosity of incident light, $\Delta n$ is an birefringence index, d is the thickness of an LC cell, $\lambda$ is the wavelength of the transmitted light, $\theta$ is the twisted angel of twisted nematic LC, and R is a phase difference. As shown in the above equation, the phase difference has the close relationship with the viewing angle. Therefore, the phase difference may be compensated so as to improve the viewing angle.

The compensation film that compensates for the phase difference and disposed between a substrate and a polarization plate may be either uniaxial material or biaxial material. Both uniaxial material and biaxial material have an anisotropic refractive index.

FIGS. 1A to 1C illustrate an ellipse having an anisotropic refractive index of a phase-difference compensation film. Assuming that the refractive indices of x, y, and z directions in an orthogonal coordinate system are nx, ny, and nz, respectively, the uniaxial property and the biaxial property are determined depending on whether nx and ny are identical or not.

Referring to FIG. 1A, in case where the refractive indices of two directions are the same and different from the refractive index of the remaining direction in the orthogonal coordinate system, it is defined "uniaxial." For example, in the uniaxial material, the relationship of three refractive indices are nx=ny>nz. On the contrary, referring to FIGS. 1B and 1C, in case where the refractive indices are different from one another such as nx>nz>ny and nx>ny>nz, it is defined "biaxial."

A compensation film is generally formed of the uniaxial material having an anisotropic refractive index. Such compensation film has an arrangement that a longer axis of the ellipse is parallel or perpendicular to the surface of the film.

The compensation film is fabricated using a method of stretching a high molecular film along one axis or two-axes. The birefringence can be obtained by having the optical axis of the compensation film form an arbitrary angle with respect to the progression direction of the film. Another method of forming the compensation film is directly coating the compensation film on a substrate. This method is often referred to as a coating-type compensation film.

The coating-type compensation film is manufactured as follows. First, after an alignment film is formed on a substrate, an alignment process is performed. The alignment process allows the optical axis of the compensation film to have an arbitrary angle afterwards.

Subsequently, an LC of optical hardness is coated with a coatable retarder material on the alignment-processed alignment layer. The LC-coated substrate is irradiated with light, so that a nematic LC of optical hardness is hardened and fixed as a film. Another alignment film for aligning the LC interposed between the upper and lower substrates of the LCD is additionally formed on the coating-type compensation film.

In the related art method of fabricating the coating-type compensation film, the alignment film initially formed on the substrate is formed by printing an organic high molecular material such as polyimide and polyamide on the substrate as an alignment material and hardening the same.

The alignment process performed on the hardened alignment film applies a rubbing method of rubbing an alignment film in a predetermined direction using a rubbing cloth of a predetermined shape. As a result, grooves may be formed in a predetermined direction on the surface of the alignment film.

The above rubbing method has advantages of easy alignment and stable alignment. Further, the rubbing method is also suitable for mass production. However, the rubbing method has a problem that a rubbing defect occurs when a roller having a defective rubbing cloth attached thereon is used during the rubbing process. Because the rubbing method using the rubbing cloth requires a direct contact between the alignment film and the rubbing cloth, it may contaminate LC due to particle attachments and a non-uniformity of the alignment upon application to a large-sized LCD. Accordingly, there is a need of a fabricating method of an LCD that overcomes drawbacks of the related art fabrication method.

SUMMARY OF THE INVENTION

By way of introduction only, a method of fabricating an LCD includes printing an alignment film on a first substrate and a second substrate and hardening the same; performing a primary alignment-process of the alignment film by rubbing the alignment film; performing a secondary alignment-process of the rubbed alignment film by irradiating light on an entire surface of the rubbed alignment film; and forming a first compensation film and a second compensation film by coating a retarder liquid crystal (LC) material on the light-irradiated alignment film and hardening the same.

A liquid crystal display includes a first substrate having a color filter layer; a second substrate having array devices including thin film transistors ("TFTs"); an LC layer filling a space formed by the first and second substrates spaced a predetermined interval; a first polarization plate and a second polarization plate attached on outer surfaces of the first and second substrates, respectively; and a first compensation film and a second compensation film coated on inner surfaces of the first and second substrates, respectively.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1A:
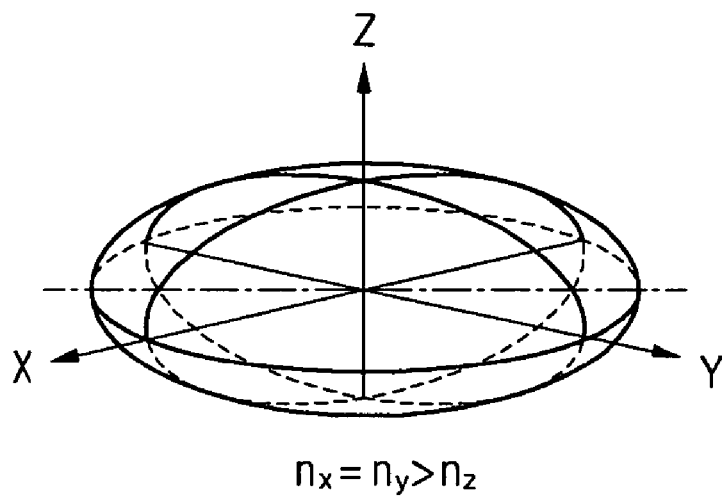
FIGS. 1A to 1C illustrate an ellipsis having an anisotropic refractive index of a phase-difference compensation film.
Figure 1B:
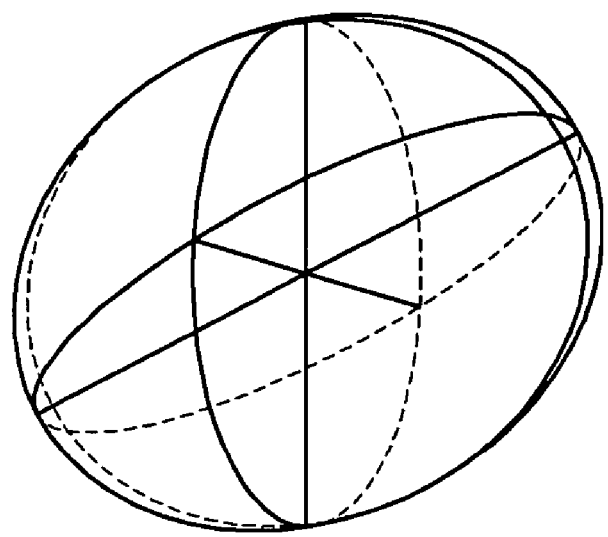
Figure 1C:
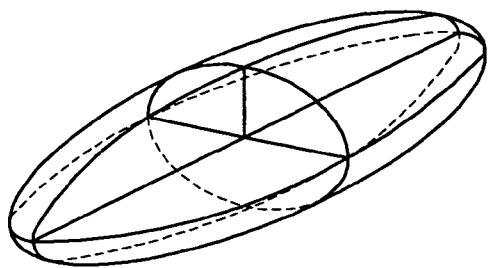
Figure 2:
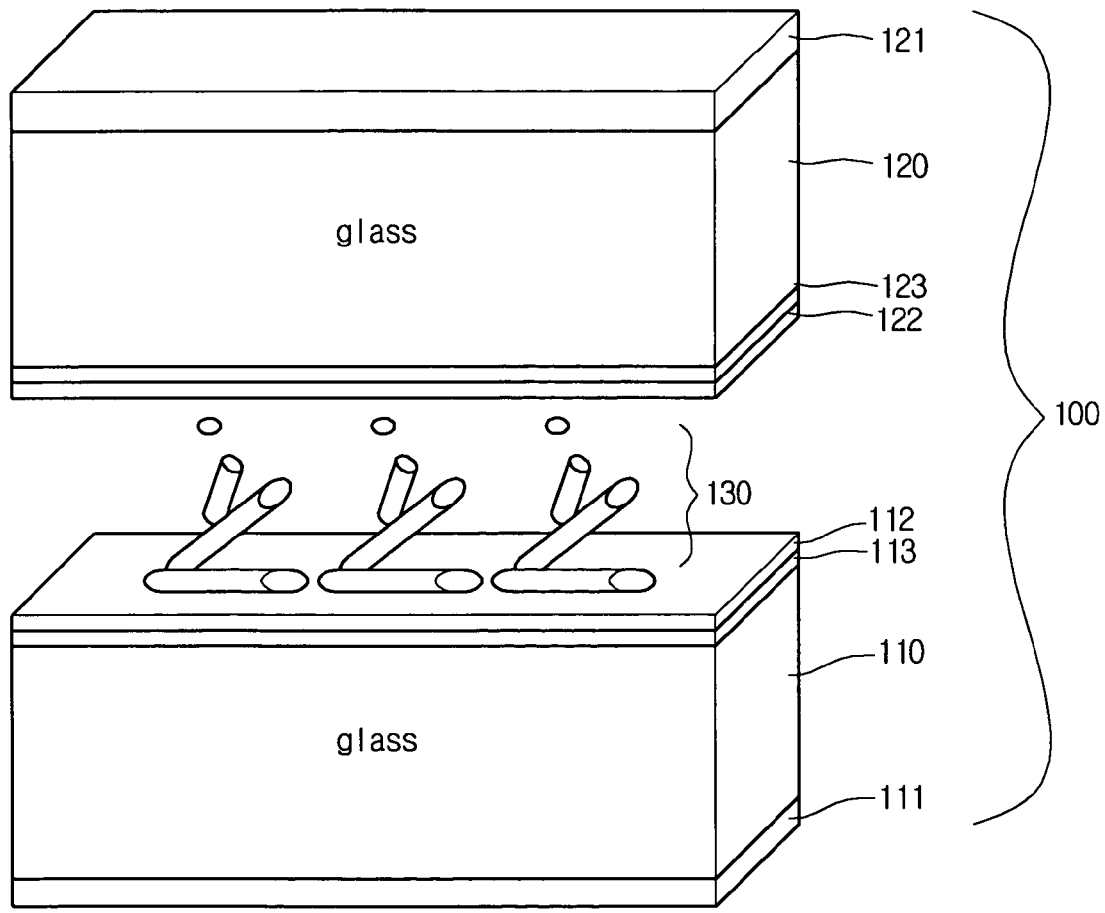
FIG. 2 is a schematic view of an LCD using a coating-type compensation film.

FIG. 2 is a schematic view of an LCD 100 using a coating-type compensation film. Referring to FIG. 2, the LCD 100 includes an upper substrate 120 having a color filter layer 122 and a lower substrate 110 having array devices 112 including TFTs. An LC layer 130 fills a space formed by the upper and lower substrates 120 and 110. A first polarization plate 121 and a second polarization plate 111 are attached on outer surfaces of the upper and lower substrates 120 and 110. The first and second polarization plates 121 and 111 are parallel to each other. A first compensation film 123 is coated on the inner surface of the upper substrate 120 and a second compensation film 113 is coated on the inner surface of the lower substrate 110. These coating-type compensation films 113 and 123 are formed by directly coating on the upper and lower substrates 120 and 110.

Although not shown, the color filter layer 122 formed on the upper substrate 120 and the array devices 112 formed on the lower substrate 110 are formed on the first and second compensation films 123 and 113. The array devices 112 include TFTs operating as switching devices and pixel electrodes are formed in a matrix type at intersections between the gate lines and the data lines.

A black matrix (BM), a color filter, and a common electrode are sequentially formed on the color filter layer 122. The first polarization plate 121 and the second polarization plate 111 transmit light having a direction parallel to an optical transmittance axis to convert natural light into linearly polarized light. The first and second polarization plates 121 and 111 are disposed on the outer surfaces of the upper plate 120 and the lower plate 110, i.e., the upper surface of the upper substrate 120 and the lower surface of the lower substrate 110, respectively.

The first compensation film 123 and the second compensation film 113 are formed by coating a retarder material on the inner surface of the substrate. The first compensation film 123 of the upper substrate 120 and/or the second compensation film 113 of the lower substrate 110 are formed by forming an alignment film made of high molecular material such as polyimide and then performing a primary alignment process and a secondary alignment process on the formed alignment film.

The primary alignment process is a rubbing process and a light-irradiation process or an ion-beam irradiation process is additionally applied as the secondary alignment process. An LC of optical hardness such as nematic LC is coated with the retarder material on the alignment-processed film. Subsequently, the coated substrate is irradiated with light, so that the nematic LC is hardened to be used as a film.

FIGS. 3A to 3D illustrate a fabrication process of a coating-type compensation film. First, referring to FIG. 3A, to align LC molecules to a predetermined direction, organic high molecular materials such as polyimide are spread on the substrate 200 to form an alignment layer 210. Solvent is evaporated at the temperature range of 60-80° C. and the LC molecules are aligned and then hardened at the temperature range of 80-200° C.

Figure 3A:
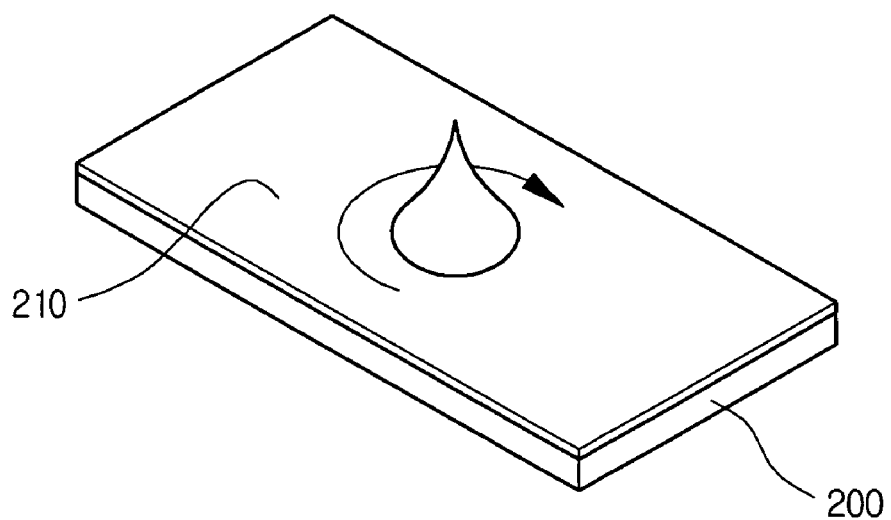
FIGS. 3A to 3D illustrate a fabricating process of a coating-type compensation film.
Figure 3A:
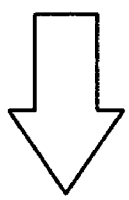
Figure 3A:
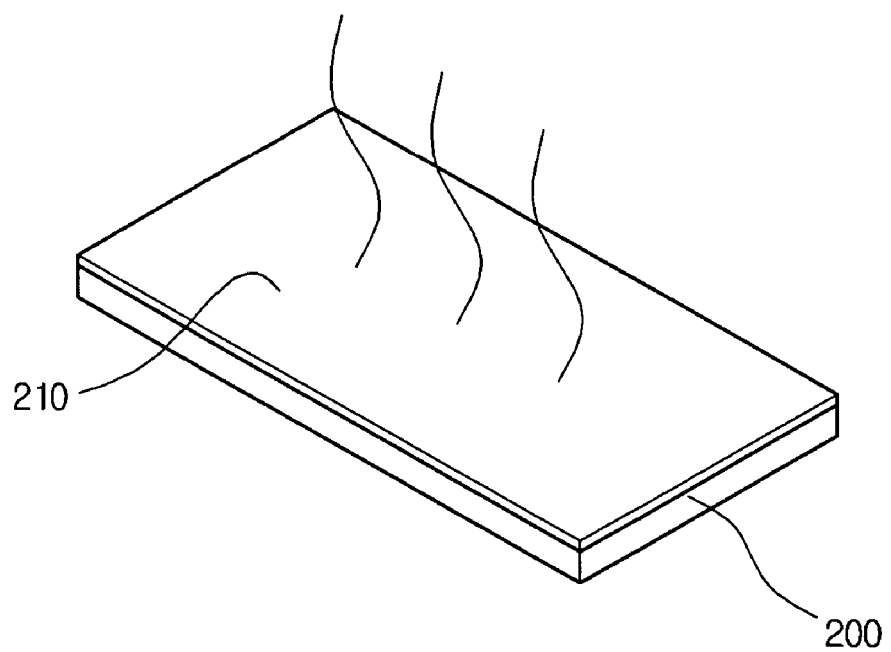
Figure 3B:
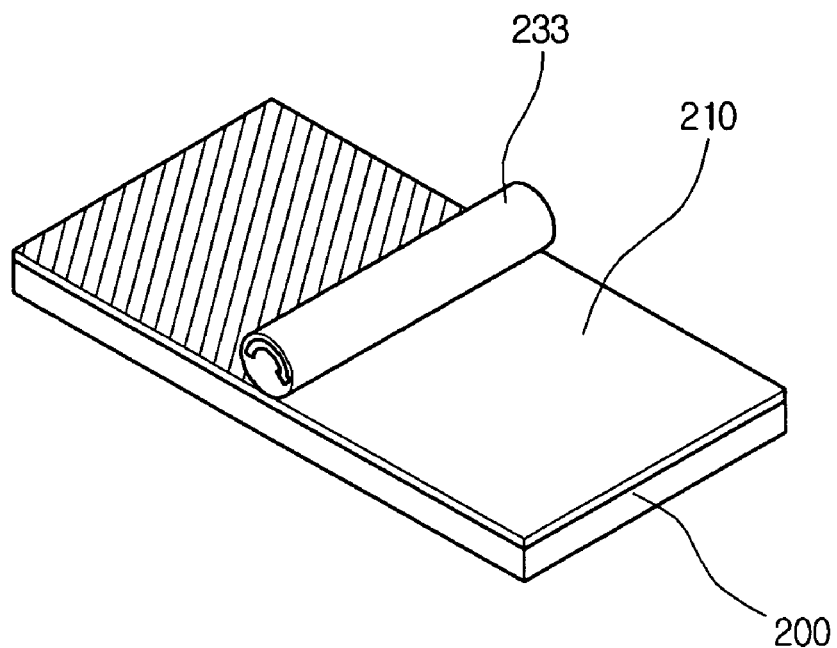

Referring to FIG. 3B, a primary alignment-process applies to the alignment layer 210. The primary alignment process includes a rubbing process of forming the alignment direction by rubbing the alignment layer 210 made from polyimide with a rubbing cloth 233. For example, the rubbing cloth 233 may include velvet, rayon, and/or nylon. Various other kinds of a rubbing cloth are possible.

Figure 3C:
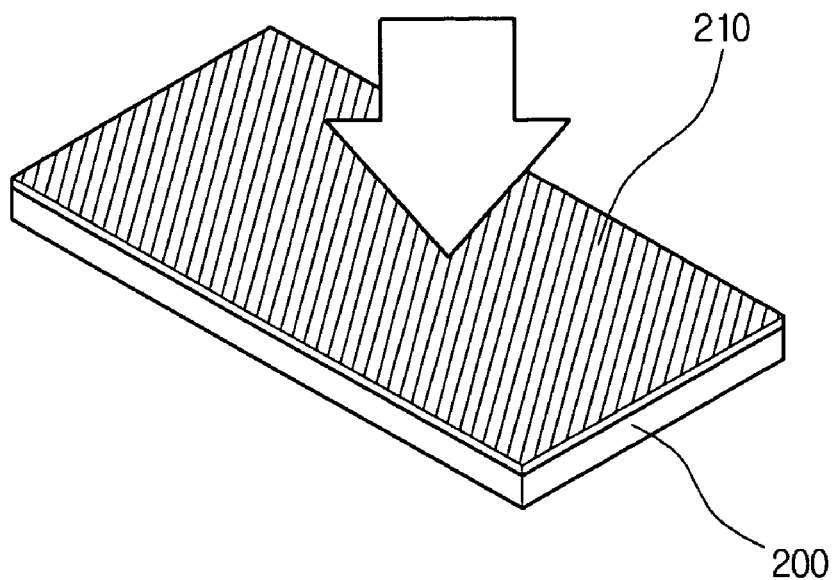

In FIG. 3C, the secondary alignment process is performed by irradiating light or an ion-beam on the alignment-processed alignment film 210. For example, a plasma-beam or an electron-beam may be used. Various other beams are possible. The direction of the light irradiation may be perpendicular to that of the rubbing and the direction of the ion-beam irradiation may be the same as that of the rubbing. The light may be linearly polarized light or partially polarized light. The method of irradiation light may be an inclined irradiation method or a vertical irradiation method. Various other polarization and/or irradiation methods are possible.

The ion used in the ion-beam is an argon ion. Various other ions are possible. An apparatus for irradiating the ion-beam or light is an entire-surface irradiation apparatus for irradiating an ion or light on the entire surface of the substrate 200. In other embodiment, a scan type apparatus that irradiates light by scanning the substrate 200 may be used.

When the primary alignment process, which is the rubbing process, is performed on the alignment film 210 and the secondary alignment process is performed, alignment uniformity may be secured, so that a coatable retarder with an improved contrast ratio may be formed. The optical axis of the fabricated compensation film may have an arbitrary angle with respect to the progression direction of the film. The control of the alignment direction of the alignment film also may be arbitrary.

Figure 3D:
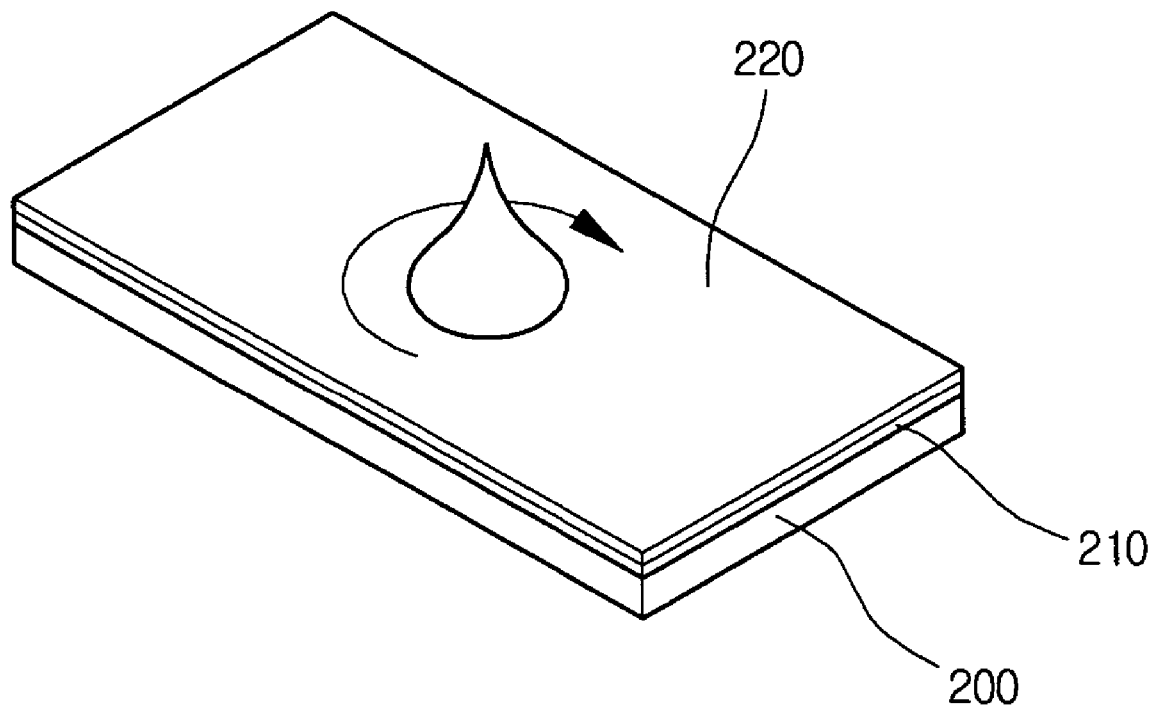

Referring to FIG. 3D, a coatable retarder material 220 is coated on the alignment film 210 processed with the primary and secondary alignment process. The substrate 200 coated with the coatable retarder material is hardened using non-polarized ultraviolet light to be fixed as a film. In other embodiments, the fabrication process described above may be for use with an LCD having a coatable retarder of a rear structure and optical films such as various compensation films, as well as an LCD forming an in-Cell type coatable retarder.

The rubbing process is performed on the alignment film, and the process of irradiating light or an ion-beam is further performed. As a result, the coatable retarder LC is aligned to improve alignment uniformity and prevent deterioration in an image quality. The alignment of the coatable retarder LC used for the compensation film may properly operate in the LCD having the coating-type compensation film.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of fabricating a compensation film, comprising:

printing an alignment film on a substrate;

evaporating a solvent of the alignment film at the temperature range of 60-80° C. and aligning a LC molecule of the alignment film;

hardening the alignment film at the temperature range of 80-200° C.;

applying a first alignment process including a rubbing process to the alignment film;

applying a second alignment process including a first irradiation process using a beam without any mask to an entire surface of the alignment film applied with the first alignment process to secure an alignment uniformity of a coatable retarder liquid crystal ("LC") material;

coating a the coatable retarder liquid crystal ("LC") material on the alignment film applied with the second alignment process; and hardening the retarder LC material by performing a second irradiation process using non-polarized ultraviolet light, wherein the beam is directly applied to the alignment film to align the alignment film, wherein the first irradiation process shortly after the rubbing process is performed, and wherein the beam is irradiated in the same direction as a rubbing direction of the rubbing process, wherein the rubbing process is performed by rubbing the alignment film with a rubbing cloth, wherein the rubbing cloth is one of velvet, rayon, nylon, wherein the beam is one of ion beam, plasma-beam, and electron-beam irradiated on an entire surface of the rubbed alignment film.

2. The method according to claim 1, wherein applying the first alignment process comprises rubbing the alignment film.

3. The method according to claim 1, wherein the beam is irradiated with an angle to the substrates.

4. The method according to claim 1, wherein the one of ion beam, plasma-beam, and electron-beam is irradiated in the same direction as the direction of the rubbing process.

5. The method according to claim 1, further comprising applying one of a linear polarization and a partial polarization to the light.

* * * * *